United States Patent
Lan et al.

(10) Patent No.: US 10,149,134 B2
(45) Date of Patent: Dec. 4, 2018

(54) NEAR FIELD DISCOVERY METHOD, USER EQUIPMENT, AND STORAGE MEDIUM

(71) Applicant: Tencent Technology (Shenzhen) Company Limited, Shenzhen, Guangdong (CN)

(72) Inventors: Zhongdi Lan, Guangdong (CN); Biao Zhang, Guangdong (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 15/442,104

(22) Filed: Feb. 24, 2017

(65) Prior Publication Data
US 2017/0171698 A1   Jun. 15, 2017

Related U.S. Application Data

(63) Continuation of application No. PCT/CN2015/088352, filed on Aug. 28, 2015.

(30) Foreign Application Priority Data

Aug. 28, 2014   (CN) .......................... 2014 1 0431483

(51) Int. Cl.
*H04W 4/10* (2009.01)
*H04L 29/12* (2006.01)
(Continued)

(52) U.S. Cl.
CPC .............. *H04W 4/80* (2018.02); *H04L 51/00* (2013.01); *H04L 61/2007* (2013.01);
(Continued)

(58) Field of Classification Search
USPC ....................................................... 455/41.1
See application file for complete search history.

(56) References Cited

U.S. PATENT DOCUMENTS 8,112,066 B2 *  2/2012  Ben Ayed ............ G06Q 20/108
                                                             455/41.1
8,131,859 B2    3/2012  Fujii et al.
(Continued)

FOREIGN PATENT DOCUMENTS

CN    102307056 A    1/2012
CN    103095895 A    5/2013
(Continued)

OTHER PUBLICATIONS

International Search Report of the ISA for PCT/CN2015/088352, Haidian District, Beijing, dated Dec. 11, 2015.
(Continued)

*Primary Examiner* — Nay A Maung
*Assistant Examiner* — Erica Fleming-Hall
(74) *Attorney, Agent, or Firm* — Harness, Dickey & Pierce, P.L.C.

(57) ABSTRACT

Disclosed are a near field discovery method, a user equipment, and a storage medium. The method comprises: a first user equipment enters a discovery mode; the first user equipment probes one or multiple second user equipment, where the one or multiple second user equipment are in a state allowing them to be probed by the first user equipment; the first user equipment transmits a probe packet to the one or multiple second user equipment, where the probe packet comprises first user information; the first user equipment receives a response packet transmitted by the second user equipment in response to the probe packet monitored thereby and transmitted by the first user equipment, where the response packet requires no reply from the first user equipment, and the response packet comprises second user information; and, the first user equipment discovers the second user equipment on the basis of the response packet.

9 Claims, 11 Drawing Sheets

(51) Int. Cl.
  *H04W 8/00* (2009.01)
  *H04W 4/80* (2018.01)
  *H04L 12/58* (2006.01)
  *H04W 4/02* (2018.01)
  *H04W 4/21* (2018.01)
  *H04W 84/12* (2009.01)

(52) U.S. Cl.
  CPC ............ *H04W 4/023* (2013.01); *H04W 4/21* (2018.02); *H04W 8/005* (2013.01); *H04W 84/12* (2013.01)

(56) References Cited

U.S. PATENT DOCUMENTS

| | | |
|---|---|---|
| 9,037,653 B2 | 5/2015 | Wiseman et al. |
| 9,055,391 B2 | 6/2015 | Kim et al. |
| 9,264,104 B2 | 2/2016 | Park et al. |
| 9,730,256 B2 | 8/2017 | Kim et al. |
| 9,736,045 B2 | 8/2017 | Meylan et al. |
| 9,787,628 B2 | 10/2017 | Wiseman et al. |
| 2006/0206592 A1 | 9/2006 | Fujii et al. |
| 2007/0293193 A1* | 12/2007 | Ramsten ............. H04M 1/2745 455/411 |
| 2009/0157473 A1* | 6/2009 | Belz ..................... G06Q 30/02 705/14.58 |
| 2009/0247197 A1 | 10/2009 | Graff et al. |
| 2012/0079019 A1 | 3/2012 | Miettinen et al. |
| 2012/0083253 A1* | 4/2012 | Van Der Vis-Kruijswijk ............ G06Q 10/10 455/414.1 |
| 2012/0171952 A1* | 7/2012 | Ohira ................. H04M 1/72525 455/41.1 |
| 2012/0289158 A1* | 11/2012 | Palin ................... H04W 8/005 455/41.2 |
| 2012/0315848 A1* | 12/2012 | Smith ..................... H04B 5/02 455/41.1 |
| 2013/0012121 A1* | 1/2013 | Chen ................... H04W 8/005 455/39 |
| 2013/0034023 A1* | 2/2013 | Jung .................... H04L 67/104 370/255 |
| 2013/0084798 A1* | 4/2013 | Faithorn ............. G06Q 20/3278 455/41.1 |
| 2013/0151608 A1 | 6/2013 | Wiseman et al. |
| 2013/0186954 A1* | 7/2013 | Denny ................ G06Q 10/107 235/375 |
| 2013/0223341 A1* | 8/2013 | Kim ..................... H04W 4/005 370/328 |
| 2013/0246575 A1 | 9/2013 | Giaretta |
| 2013/0250780 A1 | 9/2013 | Meylan et al. |
| 2013/0254378 A1 | 9/2013 | Meylan et al. |
| 2013/0254379 A1 | 9/2013 | Meylan et al. |
| 2013/0336136 A1 | 12/2013 | Meylan et al. |
| 2014/0057561 A1* | 2/2014 | Ko ...................... H04M 1/7253 455/41.1 |
| 2014/0127994 A1* | 5/2014 | Nightingale .......... H04W 4/008 455/41.1 |
| 2014/0148094 A1 | 5/2014 | Park et al. |
| 2015/0134540 A1* | 5/2015 | Law ..................... G06Q 20/351 705/72 |
| 2015/0147968 A1* | 5/2015 | Friedman ............ H04W 76/023 455/41.2 |
| 2015/0148104 A1* | 5/2015 | Friedl .................. G06Q 20/145 455/561 |
| 2015/0215263 A1 | 7/2015 | Wiseman et al. |
| 2015/0250021 A1* | 9/2015 | Stice .................. H04L 63/0853 710/16 |
| 2015/0257191 A1 | 9/2015 | Kim et al. |
| 2016/0286371 A1 | 9/2016 | Mu et al. |
| 2017/0359296 A1 | 12/2017 | Wiseman et al. |

FOREIGN PATENT DOCUMENTS

| | | |
|---|---|---|
| CN | 103220408 A | 7/2013 |
| CN | 104009980 A | 8/2014 |
| CN | 104333643 A | 2/2015 |
| KR | 20050120805 A | 12/2005 |
| KR | 20130097357 A | 9/2013 |
| KR | 20140063823 A | 5/2014 |
| WO | WO-2013086129 A1 | 6/2013 |
| WO | WO-2014074721 A1 | 5/2014 |
| WO | WO-2014-085704 A1 | 6/2014 |
| WO | WO-2015010591 A1 | 1/2015 |

OTHER PUBLICATIONS

First Korean Office Action regarding Application No. 20167035132 dated Jan. 3, 2018. English translation provided by Unitalen Attorneys at Law.

Office Action regarding Japanese Patent Application No. 2017-506326, dated Mar. 13, 2018. Translation provided by Unitalen Attorneys at Law.

Extended European Search Report regarding Application No. 15836975.1 (PCT/CN2015/088352) dated Feb. 5, 2018.

* cited by examiner

NEAR FIELD DISCOVERY METHOD, USER EQUIPMENT, AND STORAGE MEDIUM

CROSS REFERENCE TO RELATED APPLICATION

This application is a continuation of International Application No. PCT/CN2015/088352, filed on Aug. 28, 2015, which claims the priority to Chinese Patent Application No. 201410431483.0, filed on Aug. 28, 2014, both of which are hereby incorporated by reference in their entireties.

FIELD

The present disclosure relates to the field of internet technology, and in particular to a near-field discovery method and a user device.

BACKGROUND

With the rapid development of the internet, communications via some applications, for example, instant messaging tools, become more frequent. Taking QQ for example, to communicate with a user not yet added, a user needs to find the user not yet added first and then communicates with the user after adding the user. A device can not discover each other without an account number of the other party inputted.

In conventional technology, terminal devices can not discover each other, and consequently, applications in the terminal devices can not discover each other either without a registered account number of the other party inputted, failing to add contacts.

SUMMARY

A near-field discovery method is provided according to the present disclosure, by which user devices can detect and discover each other without an account number of the other party inputted, and accordingly, a user device and a storage medium are further provided according to the present disclosure.

In a first aspect of the present disclosure, a near-field discovery method is provided, which includes:

entering, by a first user device, a discovery mode;

detecting, by the first user device, one or more second user devices, where the one or more second user devices are in a state of being allowed to be detected by the first user device;

sending, by the first user device, a detection packet to the one or more second user devices, where the detection packet includes first user information;

receiving, by the first user device, a response packet sent by the one or more second user devices in response to the detection packet from the first user device on monitoring the detection packet, where the response packet is not required to be replied to by the first user device and includes second user information; and discovering, by the first user device, the one or more second user devices based on the response packet.

In a second aspect of the present disclosure, a user device including one or more processors is provided, where the one or more processors are configured to execute program instructions stored in a storage medium for the user device to perform the following operations:

detecting one or more second user devices, where the one or more second user devices are in a state of being allowed to be detected by the user device;

sending a detection packet to the one or more second user devices, where the detection packet includes first user information;

receiving a response packet sent by the one or more second user devices in response to the detection packet from the user device on monitoring the detection packet, where the response packet is not required to be replied to by the user device and includes second user information;

discovering the one or more second user devices based on the response packet.

In a third aspect of the present disclosure, a storage medium configured to store program instructions is provided, where when the program instructions are executed by a processor, the processor can perform the following operations:

detecting one or more second user devices, where the one or more second user devices are in a state of being allowed to be detected;

sending a detection packet to the one or more second user devices, where the detection packet includes first user information;

receiving a response packet sent by the one or more second user devices in response to the detection packet on monitoring the detection packet, where the response packet is not required to be replied to and includes second user information; and discovering the one or more second user devices based on the response packet.

In the near-field discovery method according to the present disclosure, the first user device in the discovery mode detects the one or more second user devices in the state of being allowed to be detected; the first user device sends the detection packet to the one or more second user devices, where the detection packet includes the first user information; the first user device receives the response packet sent by the one or more second user devices in response to the detection packet from the first user device on monitoring the detection packet, where the response packet is not required to be replied to by the first user device and includes the second user information; and the first user device discovers the one or more second user devices based on the response packet. By the method, user devices can detect and discover each other without an account number of the other party inputted.

BRIEF DESCRIPTION OF THE DRAWINGS

The drawings to be used in the descriptions of the embodiments are described briefly as follows, so that technical solutions according to the embodiments of the disclosure may become clearer. Apparently, the drawings in the following descriptions only illustrate some embodiments of the disclosure. For those skilled in the art, other drawings may be obtained based on these drawings without any creative work.

DETAILED DESCRIPTION

A near-field device discovery method is provided according to the present disclosure, by which users can discover each other without inputting account numbers of each other and add each other to a contact list in an application, and accordingly, a user device is further provided according to the present disclosure, both of which are described in detail hereinafter.

Technical solutions according to embodiments of the disclosure are described clearly and completely hereinafter in conjunction with the drawings. Apparently, the described embodiments are only a few rather than all of the embodiments of the disclosure. Any other embodiments obtained by those skilled in the art based on the embodiments according to the present disclosure without any creative work fall in the scope of the disclosure.

Figure 1A:
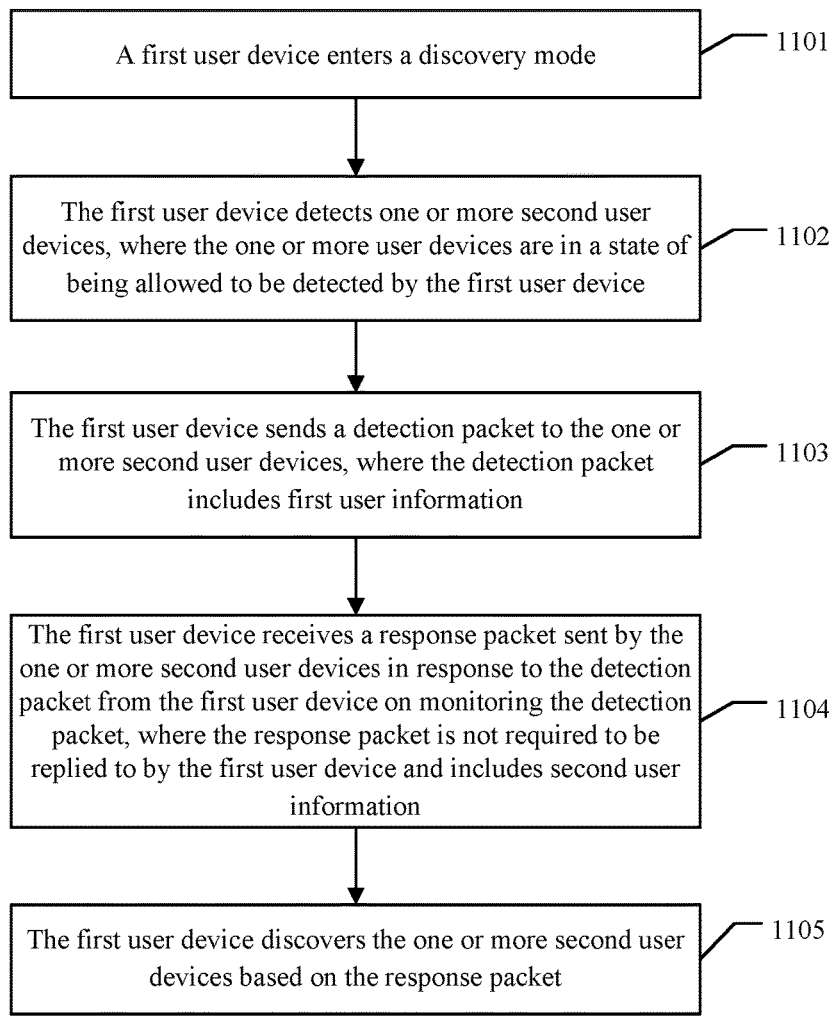
FIG. 1A is a schematic diagram of a near-field discovery method according to an embodiment of the disclosure.

As shown in FIG. 1A, a near-field discovery method is provided according to an embodiment of the disclosure, which includes steps 1101 to 1105.

In step 1101, a first user device enters a discovery mode.

In step 1102, the first user device detects one or more second user devices, where the one or more user devices are in a state of being allowed to be detected by the first user device;

In step 1103, the first user device sends a detection packet to the one or more second user devices, where the detection packet includes first user information.

In step 1104, the first user device receives a response packet sent by the one or more second user devices in response to the detection packet from the first user device on monitoring the detection packet, where the response packet is not required to be replied to by the first user device and includes second user information.

In step 1105, the first user device discovers the one or more second user devices based on the response packet.

In a possible implementation, the first user device receives a discovery mode start instruction triggered by a user which is triggered in an application the user logs onto with the first user information, and enters the discovery mode in response to the discovery mode start instruction. After discovering the one or more second user devices based on the response packet, the first user device adds the second user information to a contact list in the application, where the application in the one or more second user devices has been logged onto with the second user information.

Figure 1B:
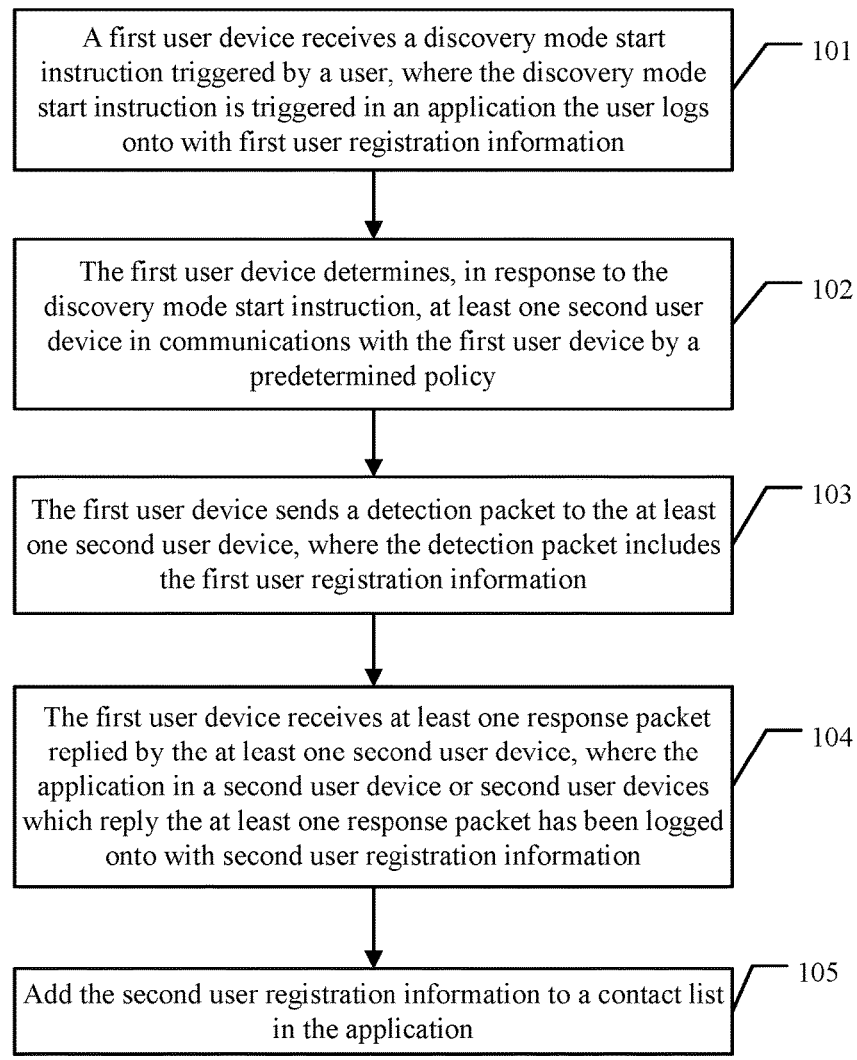
FIG. 1B is a schematic diagram of a near-field discovery method according to an embodiment of the disclosure.

As shown in FIG. 1B, a near-field device discovery method is provided according to an embodiment of the disclosure, which includes steps 101 to 105.

In step 101, a first user device receives a discovery mode start instruction triggered by a user, where the discovery mode start instruction is triggered in an application the user logs onto with first user information.

The application in the embodiment of the disclosure may be an instant messaging application, or an application such as contacts. In the embodiment of the disclosure, the instant messaging application is QQ, for example, which, however, is not limited to QQ in practical implementations.

In the embodiment of the disclosure, a discovery mode is a mode in which a user device automatically searches and discovers without an account number of a contact in another user device inputted, as described in the embodiment of the disclosure.

For example, after logging onto QQ in the first user device, the user triggers the discovery mode in the application of QQ, and after receiving a trigger instruction, the first user device performs step 102.

In step 102, the first user device determines, in response to the discovery mode start instruction, one or more second user devices in communications with the first user device by a predetermined policy.

In the embodiment of the disclosure, the first user device automatically searches, in response to the discovery mode start instruction, for one or more second user devices which can communicate with the first user device.

In the embodiment of the disclosure, the predetermined policy may be varied, and consequently, a way of the automatic searching may be varied as well.

Considering the first user device may find a lot of second user devices, which is unfavorable for establishing connections between the user and desired contacts, in the embodiment of the disclosure, the first user device and any of the one or more second user devices are restricted to have near-field communications, between which a distance is generally dozens of meters, or hundreds of meters, which does not go beyond thousands of meters.

In step 103, the first user device sends a detection packet to the one or more second user devices, where the detection packet includes the first user information.

After finding the one or more second user devices, the first user device can send a detection packet to the one or more second user devices, where the detection packet includes the first user information, and the first user information may be an account number and a nickname of the user using the first user device in the instant messaging application.

After receiving the detection packet, the one or more second user devices can obtain the first user information in the detection packet, and a user or users using the one or more second user devices can decide, based on the first user information, whether to send a response packet to the first user device.

In a case that a user using a second user device decides to establish a connection with a contact with the first user information, the user can trigger the second user device to send a response packet to the first user device, where the response packet includes second user information, and the second user information may be an account number and a nickname of the user using the second user device in the instant messaging application.

In step 104, the first user device receives at least one response packet replied by the one or more second user devices, where the application in a second user device or second user devices which reply the at least one response packet has been logged onto with second user information.

Since the at least one response packet received by the first user device may include information on a contact the user does not need to add, the user can decide, based on the second user information in the at least one response packet, whether to add the contact.

In step 105, the first user device adds the second user information to a contact list in the application.

The first user device adds second user information the user wants to the contact list in the application according to an adding instruction of the user.

In the method for discovering a near-field device in instant messaging according to the embodiment of the disclosure, the first user device receives the discovery mode start instruction triggered by the user, where the discovery mode start instruction is triggered in the application the user logs onto with the first user information; the first user device determines, in response to the discovery mode start instruction, the one or more second user devices in communications with the first user device by the predetermined policy; the first user device sends the detection packet to the one or more second user devices, where the detection packet includes the first user information; the first user device receives the at least one response packet replied by the one or more second user devices, where the application in the second user device or devices which reply the at least one response packet has been logged onto with the second user information; and the first user device adds the second user information to the contact list in the application. Compared with that a contact can not be discovered without an account number of the contact inputted in conventional technology, by the method according to the embodiment of the disclosure, a contact can be added without an account number of the contact inputted, thereby improving an efficiency of adding contacts.

Optionally, in a method for discovering a near-field device in instant messaging according to an embodiment of the disclosure based on the embodiment above as shown in FIG. 1B, determining the one or more second user devices in communications with the first user device by the predetermined policy may include:

obtaining a local area network internet protocol (IP) address of the first user device;

constructing, based on the local area network IP address of the first user device, an address interval of local area network IP addresses by a predetermined rule; and determining at least one user device with a local area network IP address within the address interval to be the one or more second user devices.

In the embodiment of the disclosure, the first user device can discover a second user device in one local area network.

To be specific, the first user enters the discovery mode, obtains a current local area network internet protocol (Internet Protocol, IP) address of its own, and may further obtain an address mask and a broadcast address. Then the first user device expands, based on the local area network IP address of its own, from a value of a fourth field of the local area network IP address by a certain range both forward and backward by the predetermined rule, to form an address interval. To avoid of a deluge of packets in the local area network caused by scanning too many IP addresses, the number of IP addresses in the address interval is set to be between 10 and 20. The first user device sends 1 or 2 detection packets to each of the IP addresses in the address interval, where a detection packet includes personal information such as a QQ number and a nickname.

A second user device can monitor detection packets in the local area network, and obtain information on the first user device from a detection packet on receiving the detection packet. Accordingly, after receiving the detection packet, the second user device can reply a response packet which is not required to be replied to, so that the first user device can quickly discover the second user terminal, thereby achieving a mutual discovery of contacts under near-field circumstances.

For example, the first user device may calculate the address range of local area network IP addresses based on the local area network IP address of its own, and scan contacts in the local area network by a one-time broadcast or one-by-one unicasts. To be specific, a method for calculating the address range of local area network IP addresses includes: obtaining the local area network IP address (being 192.168.0.a, hypothetically) of the first user device, and expanding from a value (being a, hypothetically) of a fourth field of the local area network IP address by a certain range forward and backward (it is hypothesized that an expansion difference is delta), to form the address interval. The address interval as formed is from 192.168.0.A to 192.168.0.B, where A=a−delta, and 254 is required to be added to A in a case that A is smaller than or equal to 0; B=a+delta and 254 is required to be subtracted from B in a case that B is greater than or equal to 255.

Optionally, in a method for discovering a near-field device in instant messaging according to an embodiment of the disclosure based on the embodiment above as shown in FIG. 1B, determining the one or more second user devices in communications with the first user device by the predetermined policy may include:

obtaining near-field information of the first user device, and reporting the near-field information to a policy server, for the policy sever to determine the one or more second user devices based on the near-field information;

receiving an identifier, returned by the policy server, of each of the one or more second user devices; and determining the one or more second user devices based on the identifier of each of the one or more second user devices.

In the embodiment of the disclosure, two user devices may interconnect with each other via a third party in a case that the two user devices can not directly interconnect with each other. For example, in a case that the first user device is in a mobile network such as a 2G or a 3G network and a second user device is in a local area network, the two user devices fail to meet the requirement of being in one subnet, thus data can not be communicated to each other directly. In this case, detecting and intercommunicating of the two user devices can be achieved with a third party, where the third party is called as a policy server with which interconnecting of the two user devices can be achieved.

Figure 1C:
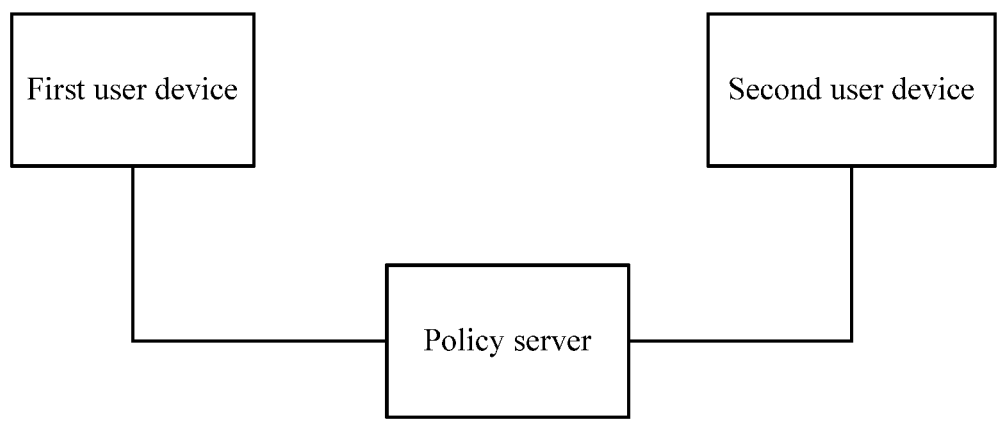
FIG. 1C is a schematic diagram of a near-field discovery method according to an embodiment of the disclosure.

For example, as shown in FIG. 1C, the first user device enters the discovery mode, and collects near-field information of its own, where the near-field information includes a local area network IP address of the first user device, a gateway IP address, a gateway MAC (Media Access Control) address, a service set identifier (SSID) of a connected WIFI (wireless fidelity) network and global positioning system (GPS). The first user device reports the near-field information as collected to the policy server. The policy server calculates a distance between the first user device and each of the one or more second user devices based on near-field information of all user devices, and determines that the first user device and a second user device meet conditions for short-distance intercommunication in a case that both of the two following conditions are met: (1), a real distance between the first user device and the second user device is shorter than 1 kilometer; and (2), the two user devices are in the same local area network or at least one of the two user devices is capable of creating a WIFI hotspot.

In more detail, it can be determined that the two user devices are in the same local area network in a case that all of the following conditions are met: (1), the two user devices have identical public network addresses; (2), the two user devices are connected to WIFI networks with identical SSIDs; and (3), the two user devices have identical MAC addresses or a distance therebetween is short enough (which is 100 meters in default and can be configured otherwise in practical implementations).

In a case that the conditions for short-distance intercommunications are met, the policy server matches the first user device with all other devices which report being in a near-field discovery mode one by one, and returns a list of second user devices meeting a condition to the first user device, thereby achieving a discovery with the help of the policy server.

Optionally, in a method for discovering a near-field device in instant messaging according to an embodiment of the disclosure based on the embodiment above as shown in FIG. 1B, determining the one or more second user devices in communications with the first user device by the predetermined policy may include:

creating and starting a wireless fidelity (WIFI) hotspot; and scanning, with the WIFI, for at least one WIFI hotspot in accordance with a predetermined rule, and determining the at least one WIFI hotspot in accordance with the predetermined rule to be the one or more second user devices.

In the embodiment of the disclosure, discovering of devices may be achieved by scanning by WIFI. For example, supposing, under some circumstances, the first user device is in a mobile network (such as a 2G or a 3G network) with a weak signal or utterly in a no-service status, the first user device and a second user device fail to meet conditions for short-distance intercommunications, where, on one hand, data can not be communicated between the two user devices and on the other hand, communications links between the two user devices each and the policy server are basically unavailable. In this case, if the first user device is capable of creating a WIFI hotspot and the second user device is capable of scanning for WIFI hotspots, the issue of discovering of near-field devices can be addressed.

To be specific, the first user device enters a WIFI hotspot creating sub-mode of the discovery mode with the one or more second user devices, encodes brief information (such as QQ numbers and nicknames) of its own into SSIDs of WIFI hotspots, creates and starts the WIFI hotspots. Then the first user device scans, with the WIFI, WIFI hotspots nearby, and filters out at least one WIFI hotspot with an SSID in accordance with the predetermined rule. The predetermined rule for filtering SSIDs may be defined as the following: QQ+ specially encoded (QQ number+nickname), which, however, is not limited to the above in practical implementations.

In a case that the number of the at least one WIFI hotspot in accordance with the predetermined rule obtained by scanning the WIFI hotspots nearby is 1 and no other new WIFI hotspot in accordance with the predetermined rule is added in a short period of time (which is set as 2 s in default and may be configured otherwise in practical implementations), the only hotspot is automatically connected according to WIFI scanning and discovering logic and a contact corresponding thereto is added after the connecting succeeds. In a case that the number of the at least one WIFI hotspot obtained by the scanning is greater than 1, basic information (which is device information as well as contact information) such as QQ numbers and nicknames are extracted from SSIDs of the at least one WIFI hotspot, to form a contact list.

The user can manually select a contact from the contact list as formed, and enter a process of automatically (or manually) connecting to a WIFI hotspot thereafter. Once such an operation is performed and the connecting succeeds, adding of the contact is completed.

Figure 2:
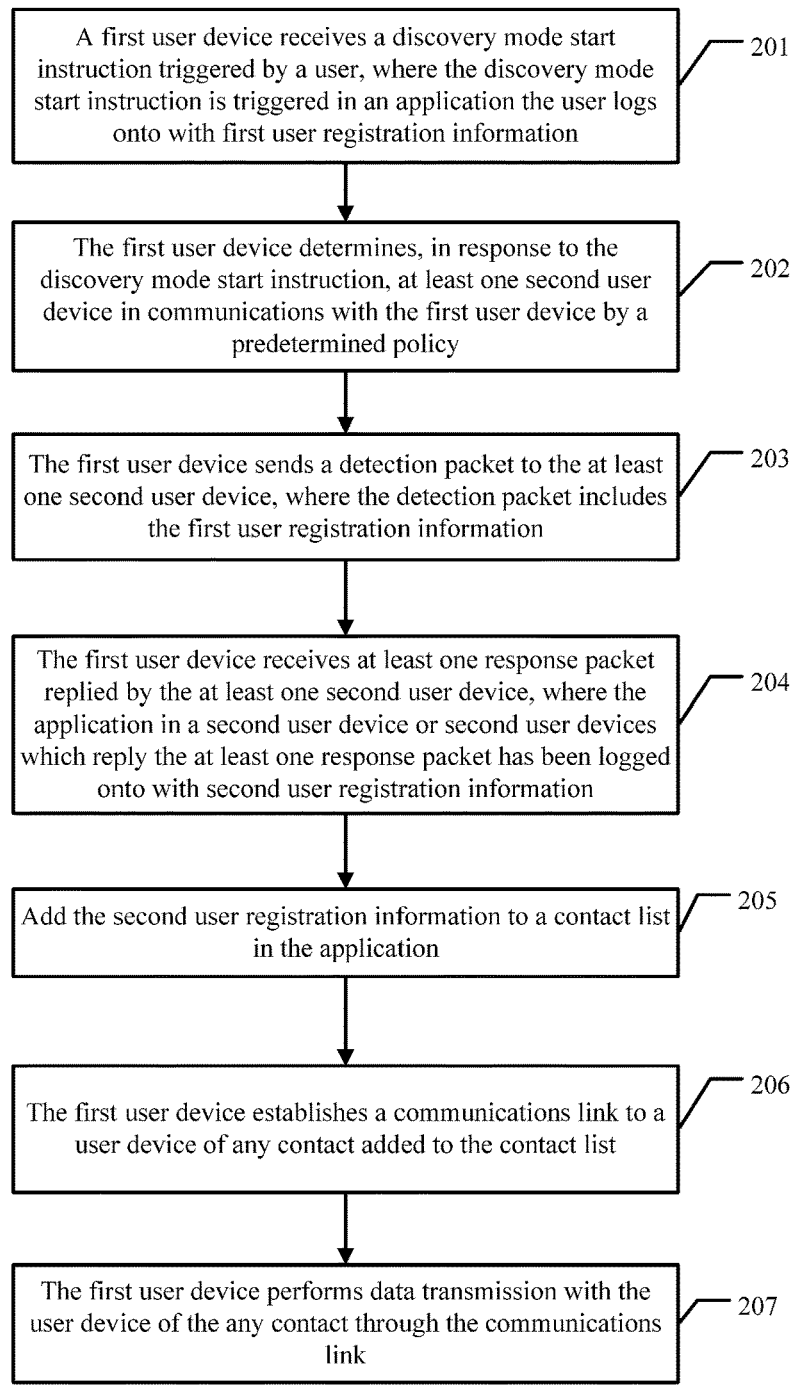
FIG. 2 is a schematic diagram of a near-field discovery method according to an embodiment of the disclosure.

As shown in FIG. 2, a method for discovering a near-field device is provided according to an embodiment of the disclosure, which includes steps 201 to 207.

Reference can be made to the descriptions of steps 101 to 105 in FIG. 1B to understand steps 201 to 205, which are not described herein redundantly.

In step 201, a first user device receives a discovery mode start instruction triggered by a user, where the discovery mode start instruction is triggered in an application the user logs onto with first user information.

In step 202, the first user device determines, in response to the discovery mode start instruction, one or more second user devices in communications with the first user device by a predetermined policy.

In step 203, the first user device sends a detection packet to the one or more second user devices, where the detection packet includes the first user information.

In step 204, the first user device receives at least one response packet replied by the one or more second user devices, where the application in a second user device or second user devices which reply the at least one response packet has been logged onto with second user information.

In step 205, the first user device adds the second user information to a contact list in the application.

In step 206, the first user device establishes a communications link to a user device of any contact added to the contact list.

After a contact is added in step 205, the first user device can establish a communications link, with which transceiving of user datagram protocol (UDP) packets can be performed through a local area network, and following file transceiving can be performed with the communications link, which includes:

selecting a file corresponding to the contact, extracting information (including a filename, a file size and a thumbnail) corresponding to the file as selected and generating an MD5 (Message Digest 5) value and a URL (Uniform Resource Locator) link for downloading, to form file information; sending the file information to the other user device based on an IP address and a port in information of the contact; and replying, by the other user device, a signaling indicating that the other user device has received the file information, after which the signaling interaction logic is completed.

In step 207, the first user device performs data transmission with the user device of the any contact through the communications link.

After the first user device sends a file signaling to a second user device in step 206, the second user device can choose to receive or refuse the file, and sends a data transmission instruction in a case that the second user device chooses to receive the file.

To be specific, the second user device receives a file message, which includes the file information from the first user device. The user can refuse or receive the file as willed. In a case that the user triggers the second user device to refuse the file, the logic is terminated, otherwise the second user device requests for downloading detailed content of the file through the HTTP (HyperText Transfer Protocol) via the URL address in the file information.

In the embodiment of the disclosure, the first user device receives the discovery mode start instruction triggered by the user, where the discovery mode start instruction is triggered in the application the user logs onto with the first user information; the first user device determines, in response to the discovery mode start instruction, the one or more second user devices in communications with the first user device by the predetermined policy; the first user device sends the detection packet to the one or more second user devices, where the detection packet includes the first user information; the first user device receives the at least one response packet replied by the one or more second user devices, where the application in the second user device or devices which reply the at least one response packet has been logged onto with the second user information; the first user device adds the second user information to the contact list in the application; the first user device establishes the communications link to the user device of the any contact added to the contact list, and performs data transmission with the user device of the any contact through the communications link. Compared with that a contact can not be discovered without an account number of the contact inputted in conventional technology, by the method according to the embodiment of the disclosure, a contact can be added without an account number of the contact inputted and data transmission can be performed with the contact added through a communications link established.

Optionally, in a method for discovering a near-field device in instant messaging according to an embodiment of the disclosure based on the embodiment above as shown in FIG. 2, determining the one or more second user devices in communications with the first user device by the predetermined policy may include:

obtaining a local area network internet protocol (IP) address of the first user device ;

constructing, based on the local area network IP address of the first user device, an address interval of local area network IP addresses by a predetermined rule; and determining at least one user device with a local area network IP address within the address interval to be the one or more second user devices.

In the embodiment of the disclosure, the first user device can discover a second user device in one local area network.

To be specific, the first user enters the discovery mode, obtains a current local area network IP (Internet Protocol, IP) address of its own, and may further obtain an address mask and a broadcast address. Then the first user device expands, based on the local area network IP address of its own, from a value of a fourth field of the local area network IP address by a certain range both forward and backward by the predetermined rule, to form an address interval. To avoid of a deluge of packets in the local area network caused by scanning too many IP addresses, the number of IP addresses in the address interval is set to be between 10 and 20. The first user device sends 1 or 2 detection packets to each of the IP addresses in the address interval, where a detection packet includes personal information such as a QQ number and a nickname.

A second user device can monitor detection packets in the local area network, and obtain information on the first user device from a detection packet on receiving the detection packet. Accordingly, after receiving the detection packet, the second user device can reply a response packet which is not required to be replied to, so that the first user device can quickly discover the second user device, thereby achieving a mutual discovery of contacts under near-field circumstances.

For example, the first user device may calculate the address range of local area network IP addresses based on the local area network IP address of its own, and scan contacts in the local area network by a one-time broadcast or one-by-one unicasts. To be specific, a method for calculating the address range of IP addresses includes: obtaining the local area network IP address (being 192.168.0.a, hypothetically) of the first user device, and expanding from a value (being a, hypothetically) of a fourth field of the local area network IP address by a certain range (it is hypothesized that an expansion difference is delta), to form the address interval. The address interval as formed is from 192.168.0.A to 192.168.0.B, where A=a−delta, 254 is required to be added to A in a case that A is smaller than or equal to 0, B=a+delta and 254 is required to be subtracted from B in a case that B is greater than or equal to 255.

Figure 3A:
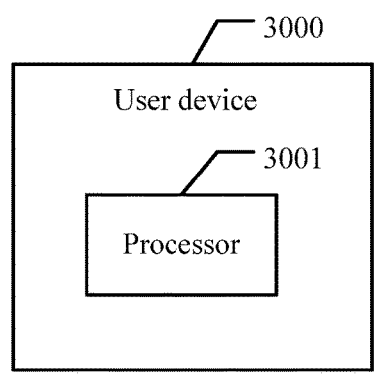
FIG. 3A is a schematic diagram of a user device according to an embodiment of the disclosure.

As shown in FIG. 3A, a user device 3000 is provided according to an embodiment of the disclosure, which includes one or more processors configured to execute program instructions stored in a storage medium for the user device 3000 to perform the following operations:

detecting one or more second user devices, where the one or more second user devices are in a state of being allowed to be detected by the user device;

sending a detection packet to the one or more second user devices, where the detection packet includes first user information;

receiving a response packet sent by the one or more second user devices in response to the detection packet from the user device on monitoring the detection packet, where the response packet is not required to be replied to by the user device and includes second user information; and discovering the one or more second user devices based on the response packet.

Optionally, in a method for discovering a near-field device in instant messaging according to an embodiment of the disclosure based on the embodiment above as shown in FIG. 2, determining the one or more second user devices in communications with the user device by the predetermined policy may include:

obtaining near-field information of the user device, and reporting the near-field information to a policy server, for the policy sever to determine the one or more second user devices based on the near-field information;

receiving an identifier, returned by the policy server, of each of the one or more second user devices; and determining the one or more second user devices based on the identifier of each of the one or more second user devices.

In the embodiment of the disclosure, two user devices may interconnect with each other via a third party in a case that the two user devices can not directly interconnect with each other. For example, in a case that the first user device is in a mobile network such as a 2G or a 3G network and a second user device is in a local area network, the two user devices fail to meet the requirement of being in one subnet, thus data can not be communicated to each other directly. In this case, detecting and intercommunicating of the two user devices can be achieved with a third party, where the third party is called as a policy server with which interconnecting of the two user devices can be achieved.

For example, as shown in FIG. 1C, the first user device enters the discovery mode, collects near-field information of its own, where the near-field information includes a local area network IP address of the first user device, a gateway IP address, a gateway MAC address, a service set identifier (SSID) of a connected WIFI (wireless fidelity) network and global positioning system (GPS). The first user device reports the near-field information as collected to the policy server. The policy server calculates a distance between the first user device and each of the one or more second user devices based on near-field information of all user devices, and determines that the first user device and a second user device meet conditions for short-distance intercommunication in a case that both of the two following conditions are met: (1), a real distance between the first user device and the second user device is shorter than 1 kilometer; and (2), the two user devices are in the same local area network or at least one of the two user devices is capable of creating a WIFI hotspot. In more detail, it can be determined that the two user devices are in the same local area network in a case that all of the following conditions are met: (1), the two user devices have identical public network addresses; (2), the two user devices are connected to WIFI networks with identical SSIDs; and (3), the two user devices have identical MAC addresses or a distance therebetween is short enough (which is 100 meters in default and can be configured otherwise in practical implementations).

In a case that the conditions for short-distance intercommunications are met, the policy server matches the first user device with all other devices which report being in a near-field discovery mode one by one, and returns a list of second user devices meeting a condition to the first user device, thereby achieving a discovery with the help of the policy server.

Optionally, in a method for discovering a near-field device in instant messaging according to an embodiment of the disclosure based on the embodiment above as shown in FIG. 2, determining the one or more second user devices in communications with the first user device by the predetermined policy may include:

creating and starting a wireless fidelity (WIFI) hotspot; and scanning, with the WIFI, for at least one WIFI hotspot in accordance with a predetermined rule, and determining the at least one WIFI hotspot in accordance with the predetermined rule to be the one or more second user devices.

In the embodiment of the disclosure, discovering of devices may be achieved by scanning with WIFI. For example, supposing, under some circumstances, the first user device is in a mobile network (such as a 2G or a 3G network) with a weak signal or utterly in a no-service status, the first user device and a second user device fail to meet conditions for short-distance intercommunications, where, on one hand, data can not be communicated between the two user devices and on the other hand, communications links between the two user devices each and the policy server are basically unavailable. In this case, if the first user device is capable of creating a WIFI hotspot and the second user device is capable of scanning for WIFI hotspots, the issue of discovering of near-field devices can be addressed.

To be specific, the first user device enters a WIFI hotspot creating sub-mode of the discovery mode with the one or more second user devices, encodes brief information (such as QQ numbers and nicknames) of its own into SSIDs of WIFI hotspots, creates and starts the WIFI hotspots. Then the first user device scans, with the WIFI, WIFI hotspots nearby, and filters out at least one WIFI hotspot with an SSID in accordance with the predetermined rule. The predetermined rule for filtering SSIDs may be defined as the following: QQ+specially encoded (QQ number+nickname), which, however, is not limited to the above in practical implementations.

In a case that the number of the at least one WIFI hotspot in accordance with the predetermined rule obtained by scanning the WIFI hotspots nearby is 1 and no other new WIFI hotspot in accordance with the predetermined rule is added in a short period of time (which is set as 2 s in default and may be configured otherwise in practical implementations), the only hotspot is automatically connected according to WIFI scanning and discovering logic and a contact corresponding thereto is added after the connecting succeeds. In a case that the number of the at least one WIFI hotspot obtained by the scanning is greater than 1, basic information (which is device information as well as contact information) such as QQ numbers and nicknames are extracted from SSIDs of the at least one WIFI hotspot, to form a contact list.

The user can manually select a contact from the contact list as formed, and enter a process of automatically (or manually) connecting to a WIFI hotspot thereafter. Once such an operation is performed and the connecting succeeds, adding of the contact is completed.

Figure 3B:
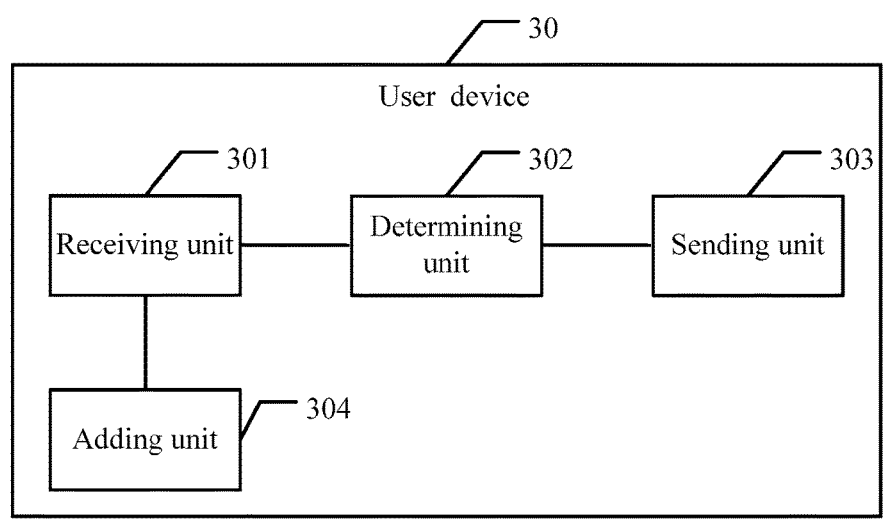
FIG. 3B is a schematic diagram of a user device according to an embodiment of the disclosure.

As shown in FIG. 3B, a user device is provided according to an embodiment of the disclosure, which includes:

a receiving unit 301, configured to receive a discovery mode start instruction triggered by a user, where the discovery mode start instruction is triggered in an application the user logs onto with first user information;

a determining unit 302, configured to determine, in response to the discovery mode start instruction received by the receiving unit 301, one or more second user devices in communications with the user device by a predetermined policy;

a sending unit 303, configured to send a detection packet to the one or more second user devices determined by the determining unit 302, where the detection packet includes the first user information, where the receiving unit 301 is further configured to receive at least one response packet replied by the one or more second user devices, where the application in a second user device or second user devices which reply the at least one response packet has been logged onto with second user information; and an adding unit 304, configured to add the second user information received by the receiving unit 301 to a contact list in the application.

In the embodiment of the disclosure, the receiving unit 301 receives the discovery mode start instruction triggered by the user, where the discovery mode start instruction is triggered in the application the user logs onto with the first user information; the determining unit 302 determines, in response to the discovery mode start instruction received by the receiving unit 301, the one or more second user devices in communications with the user device by the predetermined policy; the sending unit 303 sends the detection packet to the one or more second user devices determined by the determining unit 302, where the detection packet includes the first user information; the receiving unit 301 further receives the at least one response packet replied by the one or more second user devices, where the application in the second user device or devices which reply the at least one response packet has been logged onto with the second user information; and the adding unit 304 adds the second user information received by the receiving unit 301 to the contact list in the application. Compared with that a contact can not be discovered without an account number of the contact inputted in conventional technology, with the user device according to the embodiment of the disclosure, adding of a contact can be achieved without inputting an account number of the contact.

Figure 4:
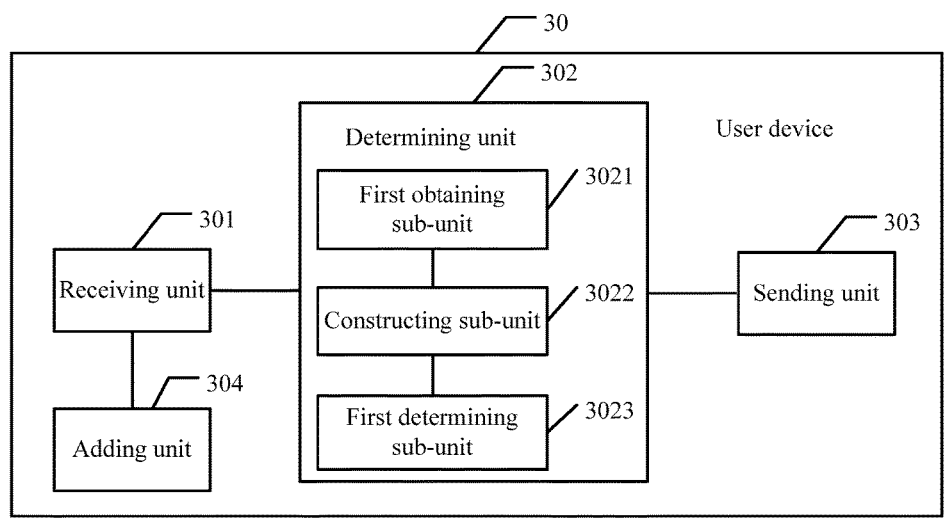
FIG. 4 is a schematic diagram of a user device according to an embodiment of the disclosure.

Optionally, as shown in FIG. 4, in a user device according to an embodiment of the disclosure based on the embodiment as shown in FIG. 3B, the determining unit 302 includes:

a first obtaining sub-unit 3021, configured to obtain a local area network internet protocol (IP) address of the user device;

a constructing sub-unit 3022, configured to construct, based on the local area network IP address, obtained by the first obtaining sub-unit 3021, of the user device, an address interval of local area network IP addresses by a predetermined rule; and a first determining sub-unit 3023, configured to determine at least one user device with a local area network IP address within the address interval constructed by the constructing sub-unit 3022 to be the one or more second user devices.

Figure 5:
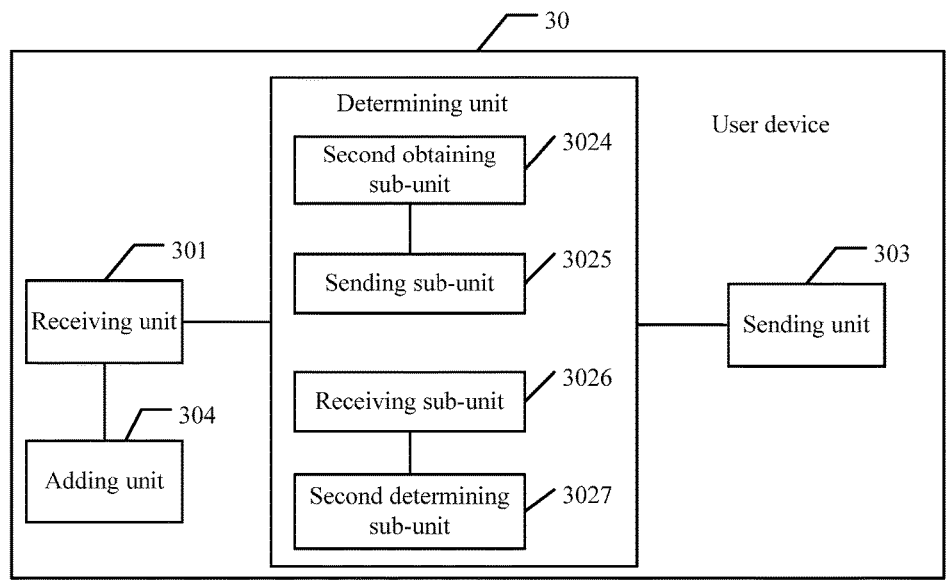
FIG. 5 is a schematic diagram of a user device according to an embodiment of the disclosure.

Optionally, as shown in FIG. 5, in a user device according to an embodiment of the disclosure based on the embodiment as shown in FIG. 3B, the determining unit 302 includes:

a second obtaining sub-unit 3024, configured to obtain near-field information of the user device;

a sending sub-unit 3025, configured to report the near-field information obtained by the second obtaining sub-unit 3024 to a policy server, for the policy sever to determine the one or more second user devices based on the near-field information;

a receiving sub-unit 3026, configured to receive an identifier, returned by the policy server, of each of the one or more second user devices; and a second determining sub-unit 3027, configured to determine the one or more second user devices based on the identifier, received by the receiving sub-unit 3026, of each of the one or more second user devices.

Figure 6:
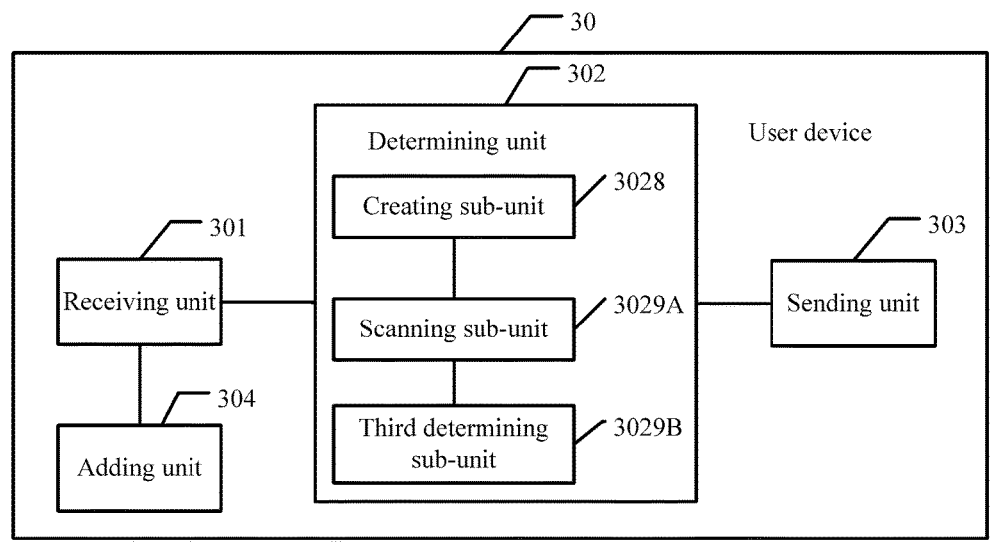
FIG. 6 is a schematic diagram of a user device according to an embodiment of the disclosure.

Optionally, as shown in FIG. 6, in a user device according to an embodiment of the disclosure based on the embodiment as shown in FIG. 3B, the determining unit 302 includes:

a creating sub-unit 3028, configured to create and start a wireless fidelity (WIFI) hotspot;

a scanning sub-unit 3029A, configured to scan, with the WIFI created and started by the creating sub-unit 3028, for at least one WIFI hotspot in accordance with a predetermined rule; and a third determining sub-unit 3029B, configured to determine the at least one WIFI hotspot, found by the scanning sub-unit 3029A through the scanning, in accordance with the predetermined rule to be the one or more second user devices.

Figure 7:
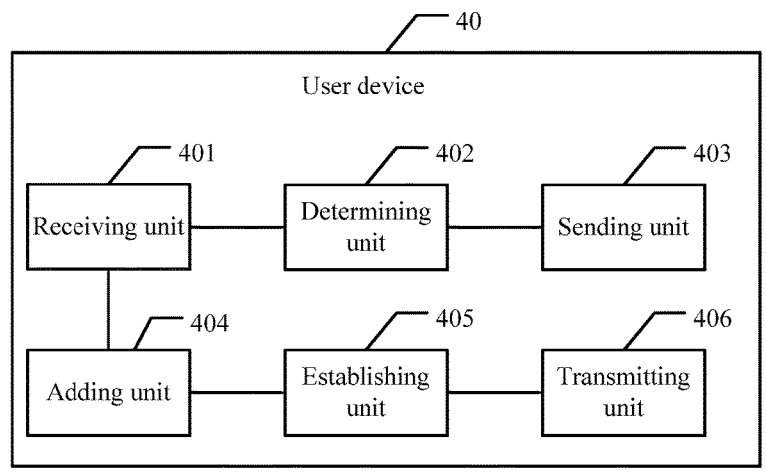
FIG. 7 is a schematic diagram of a user device according to an embodiment of the disclosure.

As shown in FIG. 7, a user device is provided according to an embodiment of the disclosure, which includes:

a receiving unit 401, configured to receive a discovery mode start instruction triggered by a user, where the discovery mode start instruction is triggered in an application the user logs onto with first user information;

a determining unit 402, configured to determine, in response to the discovery mode start instruction received by the receiving unit 401, one or more second user devices in communications with the user device by a predetermined policy;

a sending unit 403, configured to send a detection packet to the one or more second user devices determined by the determining unit 402, where the detection packet includes the first user information, where the receiving unit 401 is further configured to receive at least one response packet replied by the one or more second user devices, where the application in a second user device or second user devices which reply the at least one response packet has been logged onto with second user information;

an adding unit 404, configured to add the second user information received by the receiving unit 401 to a contact list in the application;

an establishing unit 405, configured to establish a communications link to a user device of any contact added to the contact list by the adding unit 401; and a transmitting unit 406, configured to perform data transmission with the user device of the any contact through the communications link established by the establishing unit 405.

In the embodiment of the disclosure, the receiving unit 401 is configured to receive a discovery mode start instruction triggered by a user, where the discovery mode start instruction is triggered in the application the user logs onto with the first user information; the determining unit 402 is configured to determine, in response to the discovery mode start instruction received by the receiving unit 401, one or more second user devices in communications with the user device by a predetermined policy; the sending unit 403 is configured to send a detection packet to the one or more second user devices determined by the determining unit 402, where the detection packet includes the first user information; the receiving unit 401 is further configured to receive at least one response packet replied by the one or more second user devices, where the application in a second user device or second user devices which reply the at least one response packet has been logged onto with second user information; the adding unit 404 is configured to add the second user information received by the receiving unit 401 to a contact list in the application; the establishing unit 405 is configured to establish a communications link to a user device of any contact added to the contact list by the adding unit 401; and the transmitting unit 406 is configured to perform data transmission with the user device of the any contact through the communications link established by the establishing unit 405. Compared with that a contact can not be discovered without an account number of the contact inputted in conventional technology, with the user device according to the embodiment of the disclosure, a contact can be added without an account number of the contact inputted and data transmission can be performed with the contact added through a communications link established.

Figure 8:
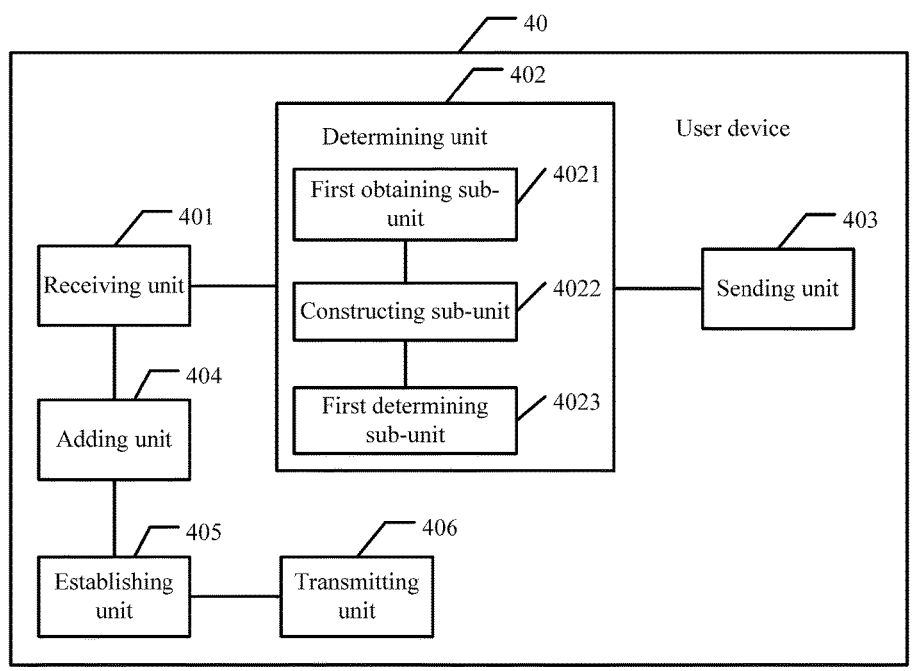
FIG. 8 is a schematic diagram of a user device according to an embodiment of the disclosure.

Optionally, as shown in FIG. 8, in a user device according to an embodiment of the disclosure based on the embodiment as shown in FIG. 7, the determining unit 402 includes:

a first obtaining sub-unit 4021, configured to obtain a local area network internet protocol (IP) address of the user device;

a constructing sub-unit 4022, configured to construct, based on the local area network IP address, obtained by the first obtaining sub-unit 4021, of the user device, an address interval of local area network IP addresses by a predetermined rule; and a first determining sub-unit 4023, configured to determine at least one user device with a local area network IP address within the address interval constructed by the constructing sub-unit 4022 to be the one or more second user devices.

Figure 9:
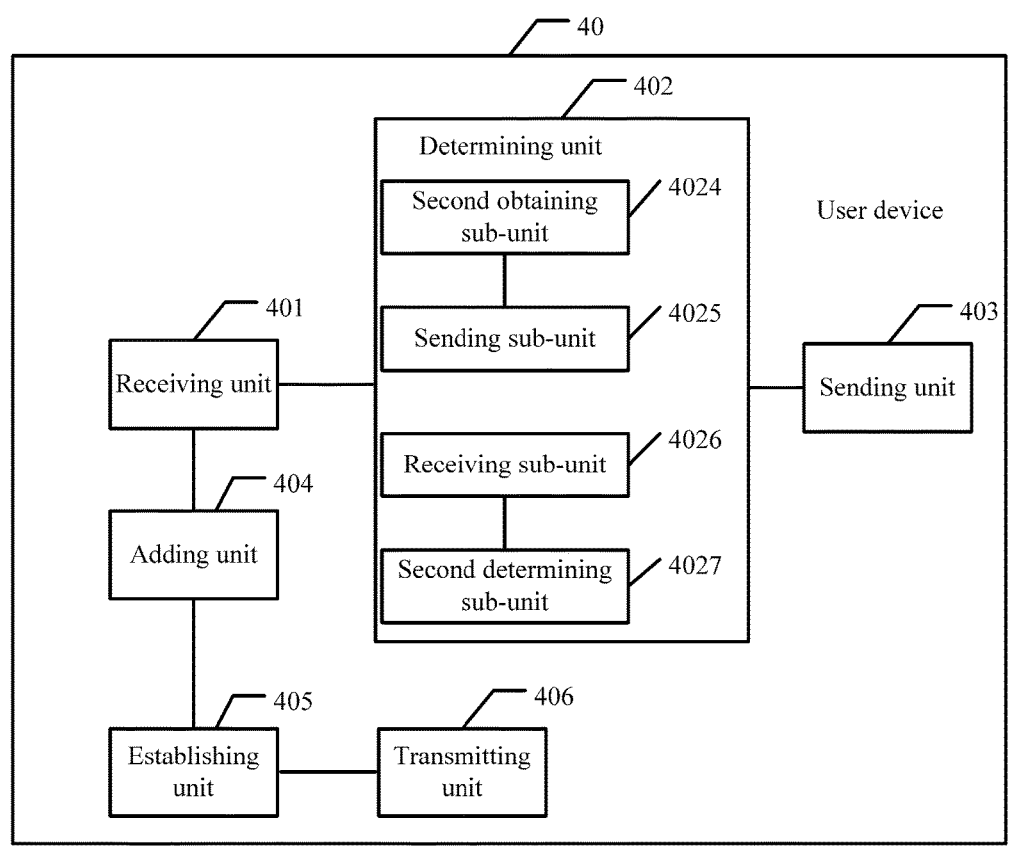
FIG. 9 is a schematic diagram of a user device according to an embodiment of the disclosure.

Optionally, as shown in FIG. 9, in a user device according to an embodiment of the disclosure based on the embodiment as shown in FIG. 7, the determining unit 402 includes:

a second obtaining sub-unit 4024, configured to obtain near-field information of the user device;

a sending sub-unit 4025, configured to report the near-field information obtained by the second obtaining sub-unit 4024 to a policy server, for the policy sever to determine the one or more second user devices based on the near-field information;

a receiving sub-unit 4026, configured to receive an identifier, returned by the policy server, of each of the one or more second user devices; and a second determining sub-unit 4027, configured to determine the one or more second user devices based on the identifier, received by the receiving sub-unit 4026, of each of the one or more second user devices.

Figure 10:
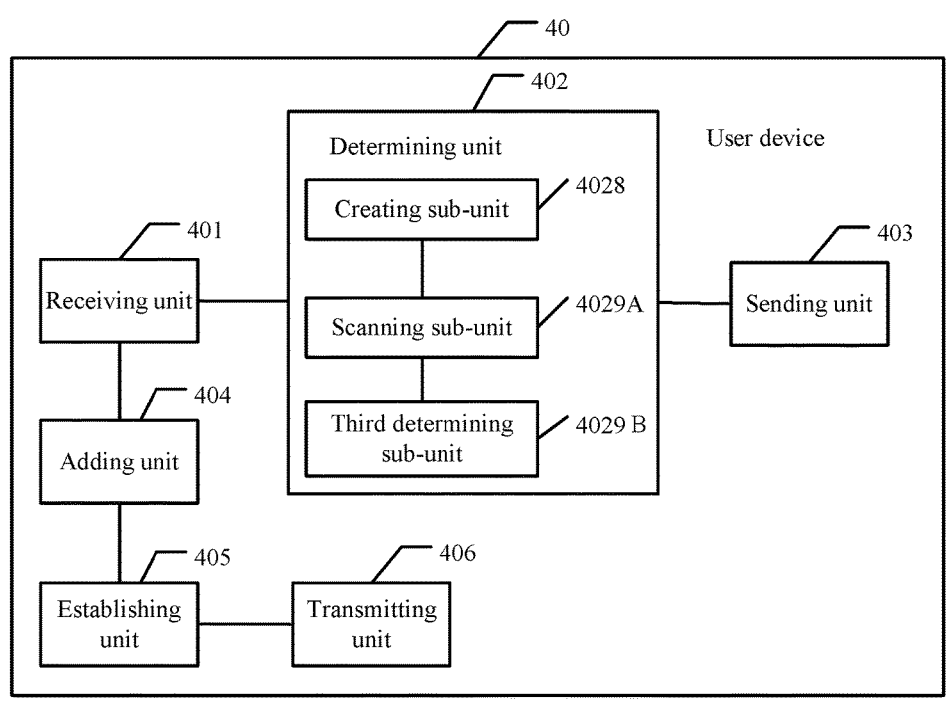
FIG. 10 is a schematic diagram of a user device according to an embodiment of the disclosure.

Optionally, as shown in FIG. 10, in a user device according to an embodiment of the disclosure based on the embodiment as shown in FIG. 7, the determining unit 402 includes:

a creating sub-unit 4028, configured to create and start a wireless fidelity (WIFI) hotspot;

a scanning sub-unit 4029A, configured to scan, with the WIFI created and started by the creating sub-unit 4028, for at least one WIFI hotspot in accordance with a predetermined rule; and a third determining sub-unit 4029B, configured to determine the at least one WIFI hotspot, found by the scanning sub-unit 4029A through the scanning, in accordance with the predetermined rule to be the one or more second user devices.

Figure 11:
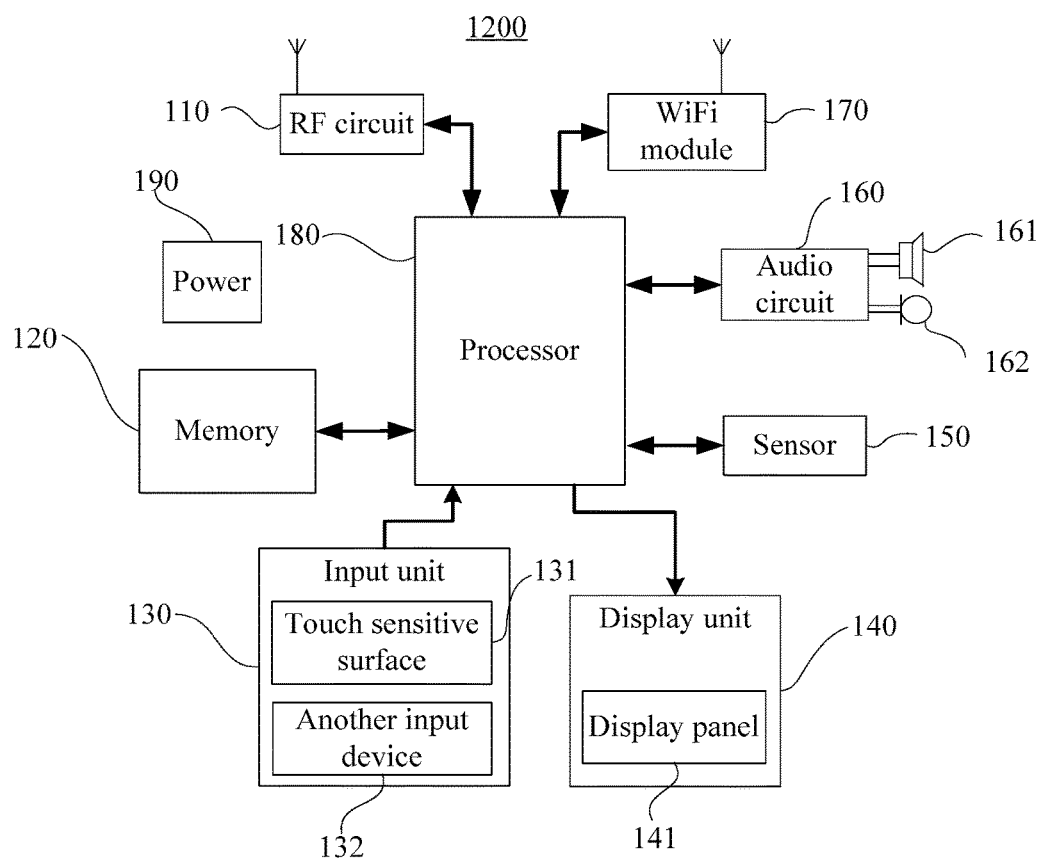
FIG. 11 is a schematic diagram of a terminal according to an embodiment of the disclosure.

Reference is made to FIG. 11, which shows a schematic structure diagram of a terminal according to an embodiment of the disclosure. The terminal can be configured to implement the methods for discovering a near-field device according to the embodiments above.

To be specific, the terminal 1200 may include a RF (Radio Frequency) circuit 110, a memory 120 including one or more computer readable storage media, an input unit 130, a display unit 140, a sensor 150, an audio circuit 160, a WiFi (wireless fidelity) module 170, a processor 180 including one or more processing cores and a power 190. Those skilled in the art shall understand the terminal is not limited to the structure shown in FIG. 11, which may include more or less components than shown in FIG. 11, combinations of some of the components, or different component arrangements.

The RF circuit 110 can be configured to receive and send signals in the process of receiving and sending information or calling. Particularly, the RF circuit 110 receives downlink information of a base station and transfers the downlink information to one or more processors 180 to process; and, in addition, sends uplink-related data to the base station. The wireless communications may adopt any communications standard or protocol, which includes but is not limited to GSM (Global System of Mobile communication), GPRS (General Packet Radio Service), CDMA (Code Division Multiple Access), WCDMA (Wideband Code Division Multiple Access), LTE (Long Term Evolution), e-mail and SMS (Short Messaging Service).

The memory 120 can be configured to store software programs and modules, and the processor 180 performs various functional applications and data processing by running the software programs and modules stored in the memory 120. The memory 120 may mainly include a program storage zone and a data storage zone, where operating systems, applications programs required by at least one function may be stored in the program storage zone and data created in the usage of the terminal 1200 may be stored in the data storage zone. Besides, the memory 120 may include a high-speed random access memory, and further include a nonvolatile memory, such as at least one magnetic disk memory, a flash memory or any other nonvolatile solid memory. Accordingly, the memory 120 may further include a memory controller, to provide an access to the memory 120 for the processor 180 and the input unit 130.

WiFi is a short distance wireless transmission technology. The terminal 1200 can help the user receive and send e-mails, browse webpages and access streaming media with the WiFi module 170, which provides an access to wireless broadband internet for the user. Although shown in FIG. 11, it is understood that the WiFi module 170 is not a necessary part of the terminal 1200 and can well be omitted without deviating from the essence of the disclosure.

The processor 180 is the control center of the terminal 1200, which connects all parts of the cellphone through interfaces and circuits, implements the functions of the terminal 1200 and processes data by running or executing the software programs or modules stored in the memory 120 and calling data stored in the memory 120, thereby realizing an overall monitoring on the cellphone. Optionally, the processor 180 may include one or more processing cores. Preferably, the processor 180 may be integrated with an application processor and a modulation/demodulation processor, where the application processor is mainly configured to process the operating systems, user interfaces and applications and the modulation/demodulation processor is mainly configured to process wireless communications. It is understood the modulation/demodulation processor may not be integrated into the processor 180.

In the embodiment, the display unit of the terminal is a touch-screen display, and the terminal further includes one or more programs as well as the memory, where the one or more programs are stored in the memory and configured to be executed by one or more processors. The one or more programs include instructions for performing the following operations:

detecting one or more second user devices, where the one or more second user devices are in a state of being allowed to be detected by the first user device;

sending a detection packet to the one or more second user devices, where the detection packet includes first user information;

receiving a response packet sent by the one or more second user devices in response to the detection packet from the first user device on monitoring the detection packet, where the response packet is not required to be replied to by the first user device and includes second user information;

discovering, by the first user device, the one or more second user devices based on the response packet.

In a possible implementation, instructions for performing the following operations are stored in the memory of the terminal: receiving a discovery mode start instruction triggered by a user, where the discovery mode start instruction is triggered in an application the user logs onto with the first user information; and entering a discovery mode in response to the discovery mode start instruction.

In a possible implementation, instructions for performing the following operations are stored in the memory of the terminal: creating and starting a wireless fidelity (WIFI) hotspot; and scanning, with the WIFI, for at least one WIFI hotspot in accordance with a predetermined rule and determining the at least one WIFI hotspot in accordance with the predetermined rule to be the one or more second user devices.

In a possible implementation, instructions for performing the following operations are stored in the memory of the terminal: obtaining a local area network internet protocol (IP) address of the first user device; constructing, based on the local area network IP address, obtained by the first obtaining sub-unit, of the first user device, an address interval of local area network IP addresses by a predetermined rule; and determining at least one user device with a local area network IP address within the address interval to be the one or more second user devices.

In the methods for discovering a near-field device according to the above embodiments of the disclosure, the first user device in the discovery mode detects the one or more second user devices in the state of being allowed to be detected; the first user device sends the detection packet to the one or more second user devices, where the detection packet includes the first user information; the first user device receives the response packet sent by the one or more second user devices in response to the detection packet from the first user device on monitoring the detection packet, where the response packet is not required to be replied to by the first user device and includes the second user information; and the first user device discovers the one or more second user devices based on the response packet. By the method, user devices can detect and discover each other without account numbers in each other inputted.

In another aspect, a computer readable storage medium is further provided according to an embodiment of the disclosure, which may be the computer readable storage medium in the memory according to the embodiment above, or an independent computer readable storage medium which is not installed to any terminal. One or more programs are stored in the computer readable storage medium, and configured to be executed by one or more processors to implement the methods according to the embodiments above. The method for discovering a near-field device and the user device according to the present disclosure are described in detail. The principle and implementation of the disclosure are described through some specific embodiments in the present disclosure, and the descriptions of the embodiments above are only for understanding the method of the disclosure and the core idea thereof. And, modifications may be made on specific implementations and the application scope of the disclosure by those skilled in the art within the spirit of the disclosure. In summary, the specification should not be interpreted as a limit to the disclosure.

The invention claimed is:

1. A method for discovering a near-field device, comprising:
   entering, by a first user device, a discovery mode;
   detecting, by the first user device, one or more second user devices, wherein the one or more second user devices are in a state of being allowed to be detected by the first user device;
   sending, by the first user device, a detection packet to the one or more second user devices, wherein the detection packet comprises first user information;
   receiving, by the first user device, a response packet sent by the one or more second user devices in response to the detection packet from the first user device on monitoring the detection packet, wherein the response packet is not required to be replied to by the first user device and comprises second user information; and
   discovering, by the first user device, the one or more second user devices based on the response packet,
   wherein the detecting, by the first user device, the one or more second user devices comprises:
   creating and starting a wireless fidelity (WIFI) hotspot, and
   scanning, with the WIFI, for at least one WIFI hotspot in accordance with a predetermined rule, and determining the at least one WIFI hotspot in accordance with the predetermined rule to be the one or more second user devices, and
   wherein the determining the at least one WIFI hotspot in accordance with the predetermined rule to be the one or more second user devices comprises:
   encoding the second user information onto an SSID of the at least one WIFI hotspot, and
   filtering out the SSID of the at least one WIFI hotspot in accordance with the predetermined rule.

2. The method according to claim 1, wherein the entering, by the first user device, the discovery mode comprises:
   receiving, by the first user device, a discovery mode start instruction triggered by a user, wherein the discovery mode start instruction is triggered in an application in the first user device; and
   entering, by the first user device, the discovery mode in response to the discovery mode start instruction.

3. The method according to claim 2, further comprising:
   establishing, by the first user device, a communications link to a user device of any contact added to a contact list; and
   performing, by the first user device, data transmission with the user device of the any contact through the communications link.

4. The method according to claim 2, wherein:
   the discovering, by the first user device, the one or more second user devices includes adding the second user information to a contact list in an application in the first user device,
   the application in the first user device has been logged onto with the first user information, and
   the application in the one or more second user devices has been logged onto with the second user information.

5. A user device, comprising one or more processors configured to execute program instructions stored in a non-transitory storage medium for the user device to perform the following operations:
   detecting one or more second user devices, wherein the one or more second user devices are in a state of being allowed to be detected by the first user device;
   sending a detection packet to the one or more second user devices, wherein the detection packet comprises first user information;
   receiving a response packet sent by the one or more second user devices in response to the detection packet from the first user device on monitoring the detection packet, wherein the response packet is not required to be replied to by the first user device and comprises second user information;
   discovering, by the first user device, the one or more second user devices based on the response packet;
   obtaining a local area network internet protocol (IP) address of the first user device;
   constructing, based on the local area network IP address of the first user device, an address interval of local area network IP addresses by a predetermined rule; and
   determining at least one user device with a local area network IP address within the address interval to be the one or more second user devices,
   wherein the constructing, based on the local area network IP address of the first user device, an address interval of local area network IP addresses by a predetermined rule comprises constructing the address interval by expanding a fourth field of the local area network IP address both forward and backward by a predetermined value.

6. The user device according to claim 5, wherein the user device is further capable of performing the following operations with the one or more processors:
receiving a discovery mode start instruction triggered by a user, where the discovery mode start instruction is triggered in an application in the first user device; and
entering a discovery mode in response to the discovery mode start instruction.

7. The user device according to claim 6, wherein the user device is further capable of performing the following operations with the one or more processors:
establishing a communications link to a user device of any contact added to a contact list; and
performing, by the first user device, data transmission with the user device of the any contact through the communications link.

8. The user device according to claim 6, wherein the user device is further capable of performing the following operation with the one or more processors:
adding the second user information to a contact list in an application in the first user device, and
wherein:
the application in the first user device has been logged onto with the first user information, and
the application in the one or more second user devices has been logged onto with the second user information.

9. A non-transitory storage medium, configured to store program instructions, wherein, when the program instructions are executed by a processor, the processor is capable of performing the following operations:
detecting one or more second user devices, wherein the one or more second user devices are in a state of being allowed to be detected;
sending a detection packet to the one or more second user devices, wherein the detection packet comprises first user information;
receiving a response packet sent by the one or more second user devices in response to the detection packet on monitoring the detection packet, wherein the response packet is not required to be replied to and comprises second user information; and
discovering the one or more second user devices based on the response packet,
wherein the detecting, by the first user device, the one or more second user devices comprises:
creating and starting a wireless fidelity (WIFI) hotspot, and
scanning, with the WIFI, for at least one WIFI hotspot in accordance with a predetermined rule, and determining the at least one WIFI hotspot in accordance with the predetermined rule to be the one or more second user devices, and
wherein the determining the at least one WIFI hotspot in accordance with the predetermined rule to be the one or more second user devices comprises:
encoding the second user information onto an SSID of the at least one WIFI hotspot, and
filtering out the SSID of the at least one WIFI hotspot in accordance with the predetermined rule.

* * * * *